United States Patent
Mallory

(10) Patent No.: US 7,285,896 B1
(45) Date of Patent: Oct. 23, 2007

(54) ELECTRICALLY-ACTUATED A.C. OR D.C. MOTOR FOR PROVIDING DIFFERENTIAL VEHICLE TRACTION

(76) Inventor: Eugene R. Mallory, 36644 117th St., Littlerock, CA (US) 93543

( * ) Notice: Subject to any disclaimer, the term of this patent is extended or adjusted under 35 U.S.C. 154(b) by 505 days.

(21) Appl. No.: 10/974,907

(22) Filed: Oct. 28, 2004

(51) Int. Cl.
*H02K 7/06* (2006.01)

(52) U.S. Cl. .................. 310/328; 180/65.1; 180/6.48; 180/60; 180/214; 180/216; 180/220; 180/298

(58) Field of Classification Search ............... 310/328; 180/65.1, 6.48, 60, 214, 216, 220, 298
See application file for complete search history.

(56) References Cited

U.S. PATENT DOCUMENTS

| | | | |
|---|---|---|---|
| 35,083 A * | 4/1862 | Cooper | 295/39 |
| 2,501,307 A * | 3/1950 | Binney | 105/136 |
| 3,859,929 A | 1/1975 | Korn et al. | |
| 4,130,065 A | 12/1978 | Susdorf et al. | |
| 4,278,027 A | 7/1981 | Eichinger et al. | |
| 4,444,120 A * | 4/1984 | Bille | 105/131 |
| 4,510,395 A | 4/1985 | Sohrt | |
| 4,911,081 A * | 3/1990 | Meret | 105/168 |
| 5,068,566 A | 11/1991 | Culp | |
| 6,619,527 B1 * | 9/2003 | Moeller | 227/10 |
| 2003/0184171 A1 * | 10/2003 | Teraoka et al. | 310/80 |

* cited by examiner

*Primary Examiner*—Christopher P. Ellis
*Assistant Examiner*—Cynthia F. Collado

(57) ABSTRACT

The device includes a housing and an outer shell including tightly wound wire coils fitted within the housing. Rotatable armatures including associated commutators are disposed at outer end portions thereof. The armatures further include spring loaded brushes and a plurality of wire coils wrapped intermediately spaced adjacent to the commutators. The device further includes a drive shaft having bearings selectively spaced therealong that defines a fulcrum axis for the armature coils and output shafts connected to the drive shaft. A power supply source is electrically coupled to an A.C. or D.C. motor and disposed external of the housing. The armatures define an epicyclical train for connecting the drive shaft in a linear path so that a driving force can be equally divided between the vehicle wheels to thereby permit one vehicle wheel to revolve faster than another vehicle wheel.

18 Claims, 2 Drawing Sheets

ELECTRICALLY-ACTUATED A.C. OR D.C. MOTOR FOR PROVIDING DIFFERENTIAL VEHICLE TRACTION

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to an electrically-actuated motor and, more particularly, to an electrically-actuated A.C. or D.C. motor providing differential traction for a vehicle.

2. Prior Art

The two driving wheels of an axle of an electric motor vehicle are each driven separately by an electric traction motor. Each driving wheel is fastened on a hollow shaft and the two hollow shafts are supported on a common rigid stationary shaft. Thus, mechanical decoupling of the two driving wheels is achieved and the slippage of one of the wheels otherwise occurring in negotiating curves is avoided.

The full speed of rotation of the driving wheels is always present at the support of the hollow shafts on the rigid shaft, which makes use of grease- or oil-lubricated bearings, particularly anti-friction bearings, necessary. Therefore, the outside diameter of the hollow shaft must be made relatively large. Furthermore, no spring or cushioning apparatus is provided for the hollow shaft with the large gear or for the traction motors, which can result in a degrading of the running performance of the vehicle.

Accordingly, a need remains for an electrically-actuated motor providing differential traction for a vehicle in order to overcome the above-noted shortcomings. The present invention satisfies such a need by providing an electrically actuated motor having comparatively reduced weight that is highly efficient. Such a motor will reduce the overall weight of a vehicle preventing mechanical power loss and allowing for longer trips to be taken before the batteries discharge.

BRIEF SUMMARY OF THE INVENTION

In view of the foregoing background, it is therefore an object of the present invention to provide an electrically-actuated motor providing differential traction for a vehicle. These and other objects, features, and advantages of the invention are provided by an A.C. or D.C. motor for powering a single-axle-driven vehicle. It is noted if an A.C. motor is employed, no brushes are necessary, as well known in the art. Solid state, frequency/voltage controlled inverters, of very high efficiency, can convert direct current to alternating current and are preferably employable by the present invention because such devices are readily available and easily manufactured.

The device includes a housing having a substantially cylindrical shape provided with a centrally disposed longitudinal axis and opposed end portions axially spaced therealong. An outer shell including a plurality of tightly wound wire coils is fitted within the housing for producing a fixed electric field. Such coils extend along a length of the housing.

The device also includes a plurality of rotatable armatures juxtaposed inside the housing and operably spaced inwardly of the outer shell. Such armatures have substantially cylindrical shapes extending along the length of the housing. The armatures include a plurality of associated commutators axially disposed at outer end portions thereof and a plurality of wire coils wrapped intermediately spaced adjacent to the commutators respectively. A plurality of spring loaded brushes press against a selected portion of the armatures respectively. Such brushes are electrically coupled to the armature coils for respectively distributing the armature coils in a circular pattern to advantageously allow for a correct sequence of current flow. An elongated drive shaft having opposed end portions is journaled within the armatures respectively and defines a fulcrum axis for the armature coils.

The present invention further includes a plurality of output shafts operably connected to the opposed end portions of the drive shaft and extending along a substantially horizontal plane parallel to the axis. Such output shafts are linearly secured to the vehicle axle at the opposed ends thereof so that the vehicle axle can advantageously be selectively accelerated during operating conditions. The output shafts have a diameter greater than a diameter of the drive shaft. The output shafts may be provided with a plurality of sleeve portions for effectively receiving the vehicle axle therein. Such sleeve portions extend axially along the output shafts for advantageously assisting to maintain the vehicle axle at a substantially stable position during operating conditions.

A power supply source is electrically coupled to the motor for generating current flow and inducing a reaction between a current in the fixed field and a current in the armatures respectively to advantageously thereby generate torque and rotate the armatures in a selected radial path. Such a power supply source is disposed external of the housing and preferably includes a rechargeable battery pack.

A plurality of bearings is selectively spaced along the drive shaft for conveniently assisting to reduce friction force during operating directions. A first group of bearings defines thrust bearings disposed medially of the armatures and a second group of bearings define thrust bearings disposed adjacent to the end portion of one armature. A third group of bearings define thrust bearings disposed adjacent to the end portion of another armature.

The armatures define an epicyclical train for connecting the drive shaft in a linear path so that a driving force can advantageously be equally divided between the vehicle wheels to thereby permit one vehicle wheel to revolve faster than another vehicle wheel

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
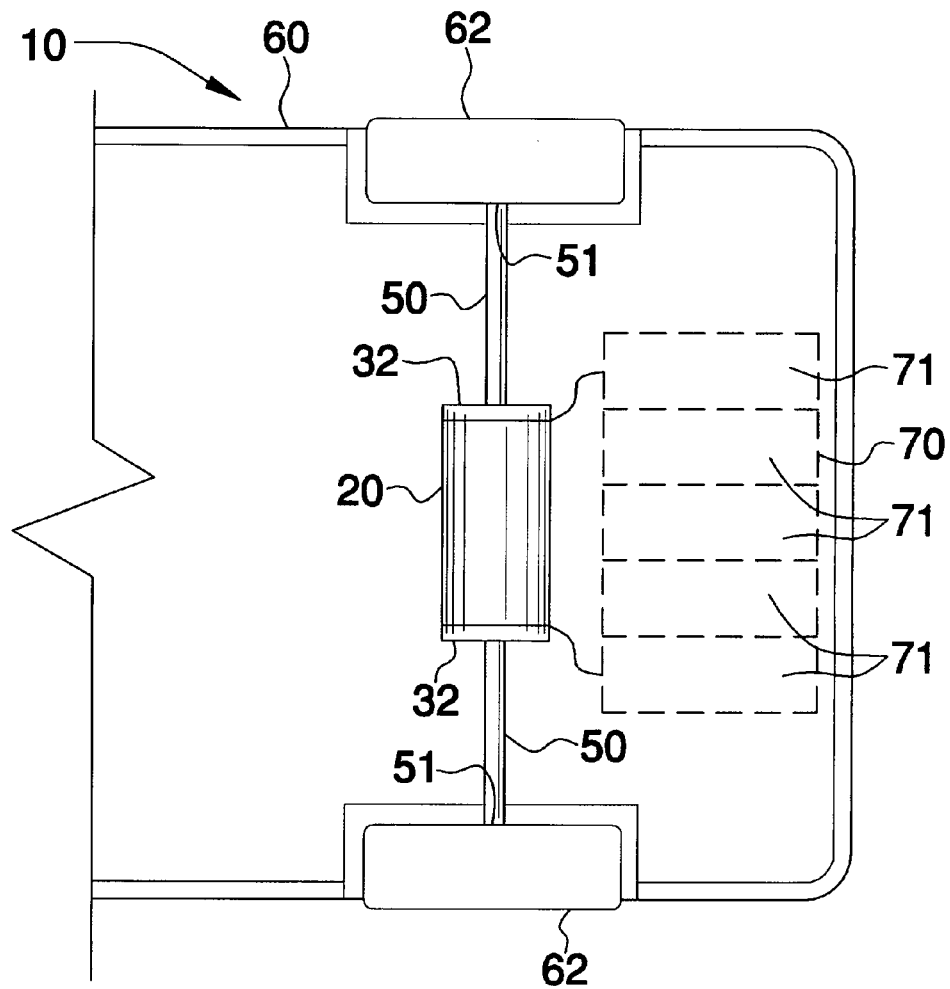
FIG. 1 is a bottom-end view showing an electrically-actuated A.C. or D.C. motor providing differential traction for a vehicle, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The device of this invention is referred to generally in FIGS. 1-4 by the reference numeral 10 and is intended to provide an electrically-actuated A.C. or D.C. motor providing differential traction for a vehicle. It should be understood that the device 10 may be used to propel many different types of vehicles and should not be limited to only single axle vehicles.

Referring initially to FIG. 1, the device 10 includes a housing 20 having a substantially cylindrical shape provided with a centrally disposed longitudinal axis and opposed end portions 21 axially spaced therealong. An outer shell 22 including a plurality of tightly wound wire coils 23 is fitted within the housing 20 for producing a fixed electric field. Such coils 23 extend along a length of the housing 20.

The device 10 also includes a plurality of rotatable armatures 30 juxtaposed inside the housing 20 and operably spaced inwardly of the outer shell 22. Such armatures 30 have substantially cylindrical shapes extending along the length of the housing 20. The armatures 30 include a plurality of associated commutators 31 axially disposed at outer end portions 32 thereof and a plurality of wire coils 33 wrapped intermediately spaced adjacent to the commutators 31 respectively. A plurality of spring loaded brushes 34 press against a selected portion of the armatures 30 respectively. Such brushes 34 are electrically coupled to the armature coils 33 for respectively distributing the armature coils 33 in a circular pattern to advantageously allow for a correct sequence of current flow. An elongated drive shaft 40 having opposed end portions 41 is journaled within the armatures 30 respectively and defines a fulcrum axis for the armature coils 33.

Figure 4:
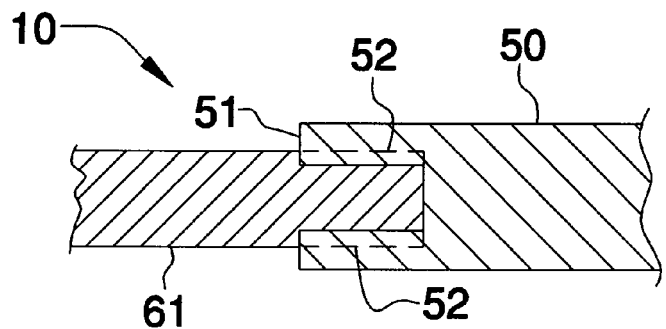
FIG. 4 is a partial cross-sectional view of the device shown in FIG. 1.
Figure 2:
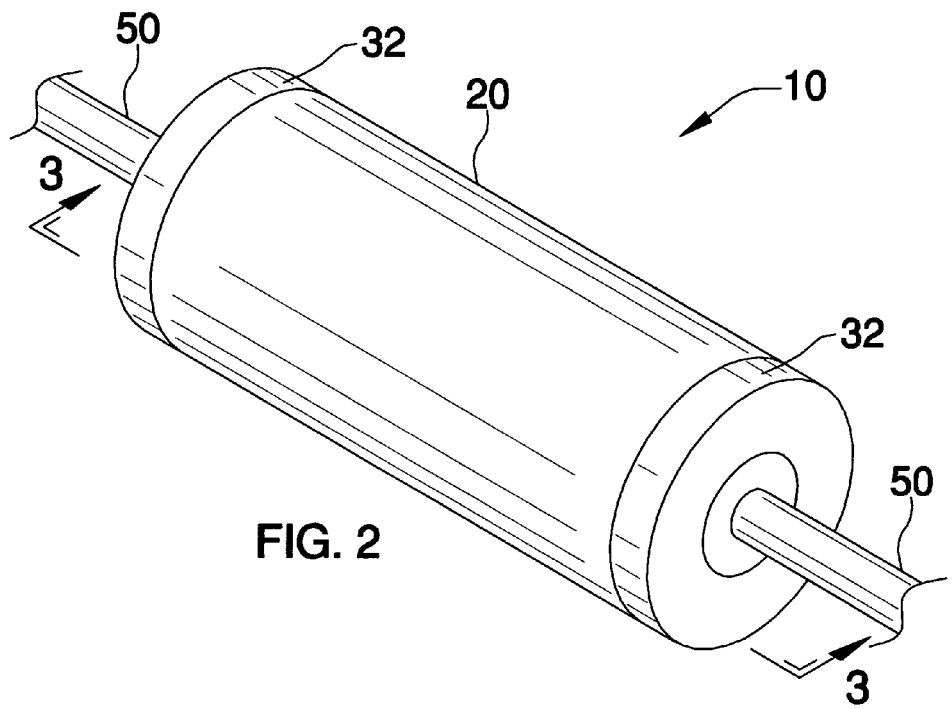
FIG. 2 is an enlarged perspective view of the device shown in FIG. 1.

The present invention further includes a plurality of output shafts 50 operably connected to the opposed end portions 41 of the drive shaft 40 and extending along a substantially horizontal plane parallel to the axis. As illustrated in FIG. 4, such output shafts 50 are linearly secured to the vehicle 60 axle 61 at the opposed ends 51 thereof so that the vehicle axle 61 can advantageously be selectively accelerated during operating conditions. The output shafts 50 have a diameter greater than a diameter of the drive shaft 40. The output shafts 50 are provided with a plurality of sleeve portions 52 for effectively receiving the vehicle axle 61 therein. Such sleeve portions 52 extend axially along the output shafts 50 for advantageously assisting to maintain the vehicle axle 61 at a substantially stable position during operating conditions.

A power supply source 70 is electrically coupled to the motor 10 for generating current flow and inducing a reaction between a current in the fixed field 22 and a current in the armatures 30 respectively to advantageously thereby generate torque and rotate the armatures 30 in a selected radial path. Such a power supply source 70 is disposed external of the housing 20 and includes a rechargeable battery pack 71.

Figure 3:
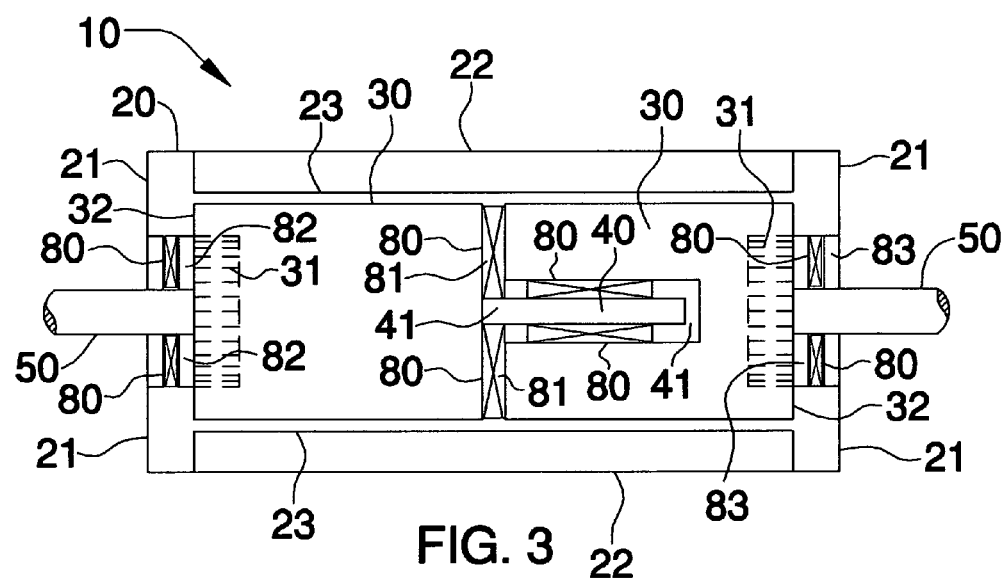
FIG. 3 is a cross-sectional view of the device shown in FIG. 1.

As shown in FIG. 3, a plurality of bearings 80 is selectively spaced along the drive shaft 40 for conveniently assisting to reduce friction force during operating directions. A first group of bearings 81 defines thrust bearings 80 disposed medially of the armatures 30 and a second group of bearings 82 define thrust bearings 80 disposed adjacent to the end portion of one armature 30. A third group of bearings 83 define thrust bearings 80 disposed adjacent to the end portion of another armature 30.

The plurality of armatures 30 define an epicyclical train for connecting the drive shaft 40 in a linear path so that a driving force can advantageously be equally divided between the vehicle wheels 62 to thereby permit one vehicle wheel 62 to revolve faster than another vehicle wheel 62. This advantageously allows the vehicle 60 to execute a turn in the road properly, as well as other driving situations where alternate wheel 62 speeds are a requirement.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A motor for powering a single-axle-driven vehicle, said device comprising:

a housing having a substantially cylindrical shape provided with a centrally disposed longitudinal axis and opposed end portions axially spaced therealong;

an outer shell comprising a plurality of tightly wound wire coils fitted within said housing and for producing a fixed electric field;

a plurality of rotatable armatures juxtaposed inside said housing and operably spaced inwardly of said outer shell, said armatures comprising a plurality of associated commutators axially disposed at outer end portions thereof, a plurality of wire coils wrapped intermediately spaced adjacent said commutators respectively, and a plurality of spring loaded brushes pressing against a selected portion of said armatures respectively, wherein said brushes are electrically coupled to said armatures coils for respectively distributing said armature coils in a circular pattern to allow a correct sequence of current flow;

an elongated drive shaft having opposed end portions journaled within said armatures respectively and defining a fulcrum axis for said armature coils;

a plurality of output shafts operably connected to said opposed end portions of said drive shaft and extending along a substantially horizontal plane parallel to the axis wherein said output shafts are linearly secured to the vehicle axle at said opposed ends thereof so that the vehicle axle can be selectively accelerated during operating conditions;

a power supply source electrically coupled to said motor for generating current flow and inducing a reaction between a current in said fixed field and a current in said armatures respectively and to thereby generate torque and rotate said armatures in a selected radial path; and a plurality of bearings selectively spaced along said drive shaft for assisting to reduce friction force during operating directions;

wherein said armatures define an epicyclical train for connecting said drive shaft in a linear path so that a driving force can be equally divided between the vehicle wheels to thereby permit one vehicle wheel to revolve faster than another vehicle wheel.

2. The motor of claim 1, wherein a first group of bearings define thrust bearings disposed medially of said armatures.

3. The motor of claim 2, wherein a second group of bearings define thrust bearings disposed adjacent said end portion of one said armatures.

4. The motor of claim 3, wherein a third group of bearings define thrust bearings disposed adjacent one said end portion of another said armatures.

5. The motor of claim 1, wherein said output shafts are provided with a plurality of sleeve portions for receiving the vehicle axle therein, said sleeve portions extending axially along said output shafts and for assisting to maintain the vehicle axle at a substantially stable position during operating conditions.

6. The motor of claim 1, wherein said power supply source comprises a rechargeable battery pack.

7. A motor for powering a single-axle-driven vehicle, said device comprising:

a housing having a substantially cylindrical shape provided with a centrally disposed longitudinal axis and opposed end portions axially spaced therealong;

an outer shell comprising a plurality of tightly wound wire coils fitted within said housing and for producing a fixed electric field;

a plurality of rotatable armatures juxtaposed inside said housing and operably spaced inwardly of said outer shell, said armatures having substantially cylindrical shapes extending along a length of said housing, said armatures comprising a plurality of associated commutators axially disposed at outer end portions thereof, a plurality of wire coils wrapped intermediately spaced adjacent said commutators respectively, and a plurality of spring loaded brushes pressing against a selected portion of said armatures respectively, wherein said brushes are electrically coupled to said armatures coils for respectively distributing said armature coils in a circular pattern to allow a correct sequence of current flow;

an elongated drive shaft having opposed end portions journaled within said armatures respectively and defining a fulcrum axis for said armature coils;

a plurality of output shafts operably connected to said opposed end portions of said drive shaft and extending along a substantially horizontal plane parallel to the axis wherein said output shafts are linearly secured to the vehicle axle at said opposed ends thereof so that the vehicle axle can be selectively accelerated during operating conditions;

a power supply source electrically coupled to said motor for generating current flow and inducing a reaction between a current in said fixed field and a current in said armatures respectively and to thereby generate torque and rotate said armatures in a selected radial path; and a plurality of bearings selectively spaced along said drive shaft for assisting to reduce friction force during operating directions;

wherein said armatures define an epicyclical train for connecting said drive shaft in a linear path so that a driving force can be equally divided between the vehicle wheels to thereby permit one vehicle wheel to revolve faster than another vehicle wheel.

8. The motor of claim 7, wherein a first group of bearings define thrust bearings disposed medially of said armatures.

9. The motor of claim 8, wherein a second group of bearings define thrust bearings disposed adjacent said end portion of one said armatures.

10. The motor of claim 9, wherein a third group of bearings define thrust bearings disposed adjacent one said end portion of another said armatures.

11. The motor of claim 7, wherein said output shafts are provided with a plurality of sleeve portions for receiving the vehicle axle therein, said sleeve portions extending axially along said output shafts and for assisting to maintain the vehicle axle at a substantially stable position during operating conditions.

12. The motor of claim 7, wherein said power supply source comprises a rechargeable battery pack.

13. A motor for powering a single-axle-driven vehicle, said device comprising:

a housing having a substantially cylindrical shape provided with a centrally disposed longitudinal axis and opposed end portions axially spaced therealong;

an outer shell comprising a plurality of tightly wound wire coils fitted within said housing and for producing a fixed electric field, said outer shell coils traveling along a length of said housing;

a plurality of rotatable armatures juxtaposed inside said housing and operably spaced inwardly of said outer shell, said armatures having substantially cylindrical shapes extending along the length of said housing, said armatures comprising a plurality of associated commutators axially disposed at outer end portions thereof, a plurality of wire coils wrapped intermediately spaced adjacent said commutators respectively, and a plurality of spring loaded brushes pressing against a selected portion of said armatures respectively, wherein said brushes are electrically coupled to said armatures coils for respectively distributing said armature coils in a circular pattern to allow a correct sequence of current flow;

an elongated drive shaft having opposed end portions journaled within said armatures respectively and defining a fulcrum axis for said armature coils;

a plurality of output shafts operably connected to said opposed end portions of said drive shaft and extending along a substantially horizontal plane parallel to the axis wherein said output shafts are linearly secured to the vehicle axle at said opposed ends thereof so that the vehicle axle can be selectively accelerated during operating conditions, said output shafts having a diameter greater than a diameter of said drive shaft;

a power supply source electrically coupled to said motor for generating current flow and inducing a reaction between a current in said fixed field and a current in said armatures respectively and to thereby generate torque and rotate said armatures in a selected radial path, said power supply source being disposed external of said housing; and a plurality of bearings selectively spaced along said drive shaft for assisting to reduce friction force during operating directions;

wherein said armatures define an epicyclical train for connecting said drive shaft in a linear path so that a driving force can be equally divided between the vehicle wheels to thereby permit one vehicle wheel to revolve faster than another vehicle wheel.

14. The motor of claim 13, wherein a first group of bearings define thrust bearings disposed medially of said armatures.

15. The motor of claim 14, wherein a second group of bearings define thrust bearings disposed adjacent said end portion of one said armatures.

16. The motor of claim 15, wherein a third group of bearings define thrust bearings disposed adjacent one said end portion of another said armatures.

17. The motor of claim 13, wherein said output shafts are provided with a plurality of sleeve portions for receiving the vehicle axle therein, said sleeve portions extending axially along said output shafts and for assisting to maintain the vehicle axle at a substantially stable position during operating conditions.

18. The motor of claim 13, wherein said power supply source comprises a rechargeable battery pack.

* * * * *